No. 688,952. Patented Dec. 17, 1901.
C. D. JANSSEN.
PLUMB.
(Application filed May 31, 1901.)
(No Model.)
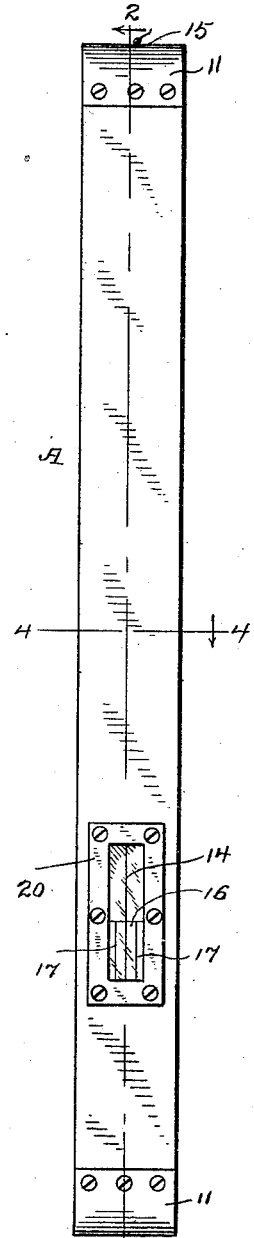
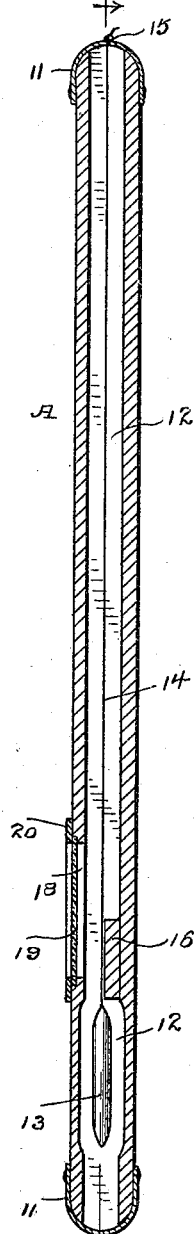
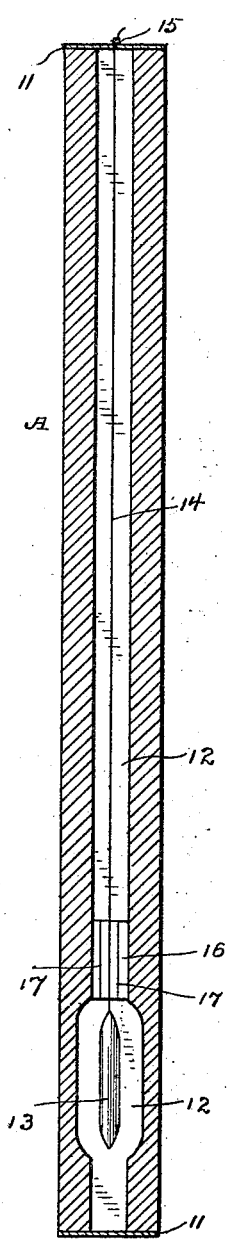
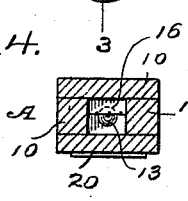
WITNESSES.
H. A. Lamb
S. W. Atherton
INVENTOR.
Carsten Diedrich Janssen
By
F. M. Wooster
Atty.

UNITED STATES PATENT OFFICE.

CARSTEN DIEDRICH JANSSEN, OF TORRINGTON, CONNECTICUT.

PLUMB.

SPECIFICATION forming part of Letters Patent No. 688,952, dated December 17, 1901.

Application filed May 31, 1901. Serial No. 62,483. (No model.)

*To all whom it may concern:*

Be it known that I, CARSTEN DIEDRICH JANSSEN, a citizen of the United States, residing at Torrington, county of Litchfield, State of Connecticut, have invented a new and useful Plumb, of which the following is a specification.

My invention has for its object to provide a plumb of the ordinary type comprising a plumb bob and line, but in which both bob and line shall be wholly inclosed, so as to be practically unaffected by heat, moisture, and changes of temperature, my novel plumb as a whole being simple and inexpensive to produce, always ready for use, and practically impossible to wear out under the ordinary conditions of use.

In the accompanying drawings, forming part of this specification, Figure 1 is an elevation of my novel plumb; Fig. 2, a vertical section on the line 2 2 in Fig. 1; Fig. 3, a vertical section on the line 3 3 in Fig. 2, and Fig. 4 is a transverse section on the line 4 4 in Fig. 1.

A denotes the case, which is made up of four longitudinal strips of wood, (indicated by 10 in Fig. 4.) The ends of the case are shown as rounded and as covered by metal plates 11, which serve to strengthen and unite the ends of the strips 10. It is an essential feature of construction that the case be provided with a central vertical recess 12, which receives the plumb-bob 13 and plumb-line 14. The exact shape or size of this recess in cross-section is wholly immaterial. Likewise is it immaterial if the recess is of the same diameter its entire length. For example, the portion of the recess in which the line is suspended may be relatively small, the lower end of the recess having an enlargement to receive the bob, as indicated in the drawings. Such enlargement is preferable, however, and it is conveniently made by cutting away portions of the strips before the latter are secured together. The line is shown as attached centrally at the top of the case by passing the line through a hole 15 in the center of the upper plate and tying a knot in the line outside of the plate, as indicated in the drawings. This construction enables the bob to be prevented from moving violently endwise in the case or tangling the line when the plumb is being carried from place to place by simply drawing the line up through the hole 15 until the bob is close to the upper cap or plate 11 and then winding the cord around that end of the case; but the device may be instantly restored to condition for use by unwinding the line and letting the bob pull it back through the hole 15 as far as permitted by the knot.

Within the case just above the plumb-bob I provide a block 16, over which the line hangs closely, as indicated in Fig. 2. The face of this block is provided with vertical graduations, as at 17. Said block 16 projects over the space for the bob sufficiently to bring its face close to the line, or so that the line may hang close to said face, in order that the relation of the line to the graduations 17 may be accurately seen, even if not examined, from a point exactly in front or at a right angle to the plane of said face of the block. In order that the plumb-line and the graduations may be conveniently seen at any time, I provide an opening 18 in the front of the case, which is covered by a glass 19, the latter being shown as held in place by a plate 20.

The use of my novel plumb is too obvious to require description. The line lies normally close to the surface of the block, but swinging freely over its surface, so that the position of the line relative to the graduations upon the block will indicate at all times and with absolute certainty whether a wall, timber, or any portion of a building is or is not plumb and the relative amount of variation from the vertical plane.

Having thus described my invention, I claim—

A plumb comprising a case consisting of four longitudinal strips secured together to form a vertical recess and having rounded ends, a curved metal plate or cap secured to and reinforcing each rounded end, a line extending through a hole in one plate or cap and knotted above it and having its lower end provided with a plumb-bob in said recess, a block in said recess projecting over the space for the bob whereby the line is in contact with the face of the block when in use, the said face of the block being provided with graduations, a glass-covered opening being formed in the front of the case through which the face of the block and the plumb-line may be seen.

In testimony whereof I affix my signature in presence of two witnesses.

CARSTEN DIEDRICH JANSSEN.

Witnesses:
JAMES E. MALLETTE,
BERNARD E. HIGGINS.